(12) United States Patent
Frankenberger et al.

(10) Patent No.: US 8,091,837 B2
(45) Date of Patent: Jan. 10, 2012

(54) REDUCTION OF FRICTIONAL LOSSES IN THE REGION OF BOUNDARY LAYERS ON SURFACES, AROUND WHICH A FLUID FLOWS

(75) Inventors: Eckart Frankenberger, Hamburg (DE); Matthias Meussen, Toulouse (FR)

(73) Assignee: Airbus Deutschland GmbH, Hamburg (DE)

( * ) Notice: Subject to any disclaimer, the term of this patent is extended or adjusted under 35 U.S.C. 154(b) by 911 days.

(21) Appl. No.: 11/911,138

(22) PCT Filed: Apr. 5, 2006

(86) PCT No.: PCT/EP2006/003094
§ 371 (c)(1),
(2), (4) Date: Feb. 14, 2008

(87) PCT Pub. No.: WO2006/108542
PCT Pub. Date: Oct. 19, 2006

(65) Prior Publication Data
US 2009/0266937 A1    Oct. 29, 2009

Related U.S. Application Data

(60) Provisional application No. 60/670,200, filed on Apr. 11, 2005.

(30) Foreign Application Priority Data

Apr. 11, 2005  (DE) .......................... 10 2005 016 570

(51) Int. Cl.
*B64C 21/06* (2006.01)

(52) U.S. Cl. ....................................................... 244/209
(58) Field of Classification Search .................. 244/208, 244/209
See application file for complete search history.

(56) References Cited

U.S. PATENT DOCUMENTS

| 3,203,648 | A |   | 8/1965  | Vanesian |
| 3,719,207 | A |   | 3/1973  | Takeda |
| 4,671,474 | A |   | 6/1987  | Haslund |
| 4,932,612 | A |   | 6/1990  | Blackwelder et al. |
| 5,366,177 | A | * | 11/1994 | DeCoux ........................ 244/201 |
| 6,752,358 | B1 |  | 6/2004  | Williams et al. |

FOREIGN PATENT DOCUMENTS

| EP | 0532093 A1   | 3/1993 |
| FR | 2583118 A1   | 6/1985 |
| JP | 2003-503263 A | 1/2003 |
| RU | 2032595 C1   | 4/1995 |

* cited by examiner

*Primary Examiner* — Rob Swiatek
*Assistant Examiner* — Valentina Xavier
(74) *Attorney, Agent, or Firm* — Christopher Paradies; Fowler White Boggs P.A.

(57) ABSTRACT

An aerodynamic body with a plurality of nozzles for throttling a fluid flow to be removed by suction through the nozzles in a self-regulated fashion is disclosed. The aerodynamic body according to one example, includes a plurality of throttling nozzles with a throttle section that is defined by an inlet and an outlet. In one example, the interior wall of the throttle section may be designed such that an effective flow cross section is reduced in a self-regulated fashion due to the creation of turbulences on the interior wall of the throttle section as the pressure differential between the inlet and the outlet of the throttle section increases.

14 Claims, 2 Drawing Sheets

Sectional View A-B

Sectional View A-B

REDUCTION OF FRICTIONAL LOSSES IN THE REGION OF BOUNDARY LAYERS ON SURFACES, AROUND WHICH A FLUID FLOWS

REFERENCE TO RELATED APPLICATIONS

This application claims the benefit of the filing date of German Patent Application No. 10 2005 016 570.2 filed Apr. 11, 2005 and of U.S. Provisional Patent Application No. 60/670,200 filed Apr. 11, 2005, the disclosure of which applications is hereby incorporated herein by reference.

FIELD OF THE INVENTION

Generally, the field relates to a realization for reducing the frictional losses in the region of boundary layers on surfaces, around which a fluid flows. The field specifically pertains to an aerodynamic body with a plurality of nozzles for throttling a fluid flow to be removed by suction through the nozzles in a self-regulated fashion. The field also relates to an aircraft equipped with such a suction system. Lastly, the field pertains to the utilization of a plurality of the aforementioned throttling nozzles for reducing the frictional losses on a surface, around which a fluid flows.

In the context of the aerodynamic body, the term aerodynamic body generally refers to the components of an aircraft that are respectively subjected to dynamic lifting forces forces of suction in-flight due to the air flowing around them. This includes, in particular, the aerodynamic bodies of the aerodynamic body group comprising the fuselage, the airfoils, the elevator unit, the rudder unit and the engine fairings.

BACKGROUND OF THE INVENTION

When a fluid flows around a surface, frictional losses generally occur in the region of the boundary layer on the surface, around which the fluid flows. The respective type of boundary layer (laminar or turbulent) formed by the fluid flowing over the surface of a solid body significantly influences the flow resistance and the frictional losses associated therewith: when a laminar boundary layer is formed, comparatively low relative velocities occur directly on the surface of the body, around which the fluid flows, wherein the resulting frictional forces are also relatively low as shown in FIG. 1a. However, the formation of a turbulent boundary layer may result in comparatively high relative velocities directly on the surface the body, around which the fluid flows, wherein these relative velocities approximately correspond to the velocity of the fluid on the surface of the body outside the boundary layer such that correspondingly high frictional forces occur as graphically illustrated in FIG. 1c.

Since frictional losses of this type may naturally be undesirable, it is attempted in the fields of aeronautical and aerospatial engineering to maintain the frictional losses on the surfaces of aircraft and, in particular, on the airfoils as low as possible by stabilizing the boundary layer in the laminar range. According to one approach to this problem, for example, the boundary layer is constantly maintained in the laminar range by removing a suitable volumetric fluid flow from the boundary layer in a planar fashion by suction as schematically illustrated in FIG. 1b. In this case, the fluid volume to be removed by suction is dependent on the distribution of the pressure and the lift in the flow direction. Such a volumetric flow may be generated by means of suction, for example, by providing the body, around which the fluid flows, with a micro-perforated surface such that a suitable volumetric flow can be removed by suction with the aid of suction chambers arranged underneath the micro-perforated surface as schematically illustrated in FIG. 2.

However, this realization for stabilizing a boundary layer in the laminar range by generating a volumetric suction flow may have disadvantages. For example, an adaptation of the suction power to pressure conditions that are variant with respect to the time and/or the location in the flow direction may not be possible or may require an unjustifiable expenditure for the number of suction chambers and/or a corresponding control for the suction system. Consequently, either an insufficient or an excessive air volume may be removed by suction with the known realization for stabilizing a boundary layer in the laminar range by generating a volumetric suction flow with the aid of a micro-perforated surface.

Furthermore, variations in the pressure and lift conditions may also occur transverse to the flow direction. However, the realization known so far for stabilizing a boundary layer in the laminar range by generating a volumetric suction flow by means of rigid suction chambers extending transverse to the flow direction may hardly be able to manage these variations. These pressure and lift conditions that vary in and transverse to the flow direction are graphically illustrated in FIG. 3 and therefore may result in the removal of a non-optimal or an excessive air volume by suction that unnecessarily increases the system and installation expenditures, for example, for a corresponding control and, in turn, may result in additional and undesirable weight as well as manufacturing and operating costs.

SUMMARY OF THE INVENTION

According to one example, a specially designed aerodynamic body, with a correspondingly equipped aircraft and with the utilization of a plurality of the aforementioned throttling nozzles are provided.

This may provide a realization for stabilizing a boundary layer in the laminar range by removing by suction, a suitable volumetric flow on an aerodynamic body, around which a fluid flows, wherein the realization continuously adjusts the volumetric flow removed by suction optimally and automatically to the location- and time-variant distribution of the pressure and the lift on the body, around which the fluid flows.

The aerodynamic body according to one example comprises a plurality of nozzles in its surface that serve for throttling the fluid flow to be removed by suction through the nozzles in a self-regulated fashion. These nozzles respectively comprise a throttle section that is defined by an inlet and an outlet. The interior wall of the throttle section is realized in such a way that the effective flow cross section of the nozzle is reduced in a self-regulated fashion as the suction or pressure differential between the inlet and the outlet of the throttle section increases due to the formation of turbulences on the interior wall of the throttle section.

A basic concept, in one example, therefore consists of utilizing the flow conditions and the associated pressure conditions occurring on the surface of the aerodynamic body in connection with the throttling nozzles, namely by taking advantage of the fact that the lowest forces of suction or pressure always act upon the locations of the aerodynamic body surface, at which the highest flow velocities occur (suction with negative sign!). When the outlet of such a throttling nozzle is subjected to a defined suction pressure in the region of high flow velocities that is (not much) lower than the force of suction acting upon the surface, a laminar volumetric fluid flow is formed in the throttle section of the nozzle. Higher forces of suction or pressure (suction with negative sign!) are created, in contrast, in other regions in which the flow velocity is lower. In this case, the suction pressure at the outlet of the nozzle is significantly lower than the force of suction on the surface of the aerodynamic body such that the drop of pressure over the throttle section is higher and a turbulent flow results in the throttle section.

The effective nozzle diameter or the effective flow cross section of the nozzle is reduced in that turbulences are created on the interior wall of the throttle section such that the unobstructed flow of the fluid through the nozzle is impaired. Although the flow velocity of the fluid flow to be removed by suction through the nozzle increases as the pressure differential between the inlet and the outlet of the throttle section rises, the effect of the turbulences being created increases, in comparison, more significantly such that the volumetric flow trough the throttle section is reduced.

As described above, a very low drop of pressure or suction between the inlet and the outlet of the throttle section may result in an approximately laminar flow therein such that the flow cross section substantially corresponds to the clear cross section of the throttle section. However, if a significant drop of pressure occurs between the inlet and the outlet of the throttle section, rather turbulent flow conditions may be created in the throttle section such that the effective flow cross section of the throttle section is reduced. This may make it possible for the throttling nozzle according to one example, to remove a large volumetric flow by suction in regions of high flow velocities and therefore, turbulent boundary layers that result in high frictional losses while a small volumetric flow is removed by suction in regions of lower flow velocities and therefore, laminar boundary layers that result in low frictional losses. The volumetric flow removed by suction therefore may be adjusted to the respectively required location- and time-variant suction on a boundary layer under different operating conditions.

Consequently, it may no longer be necessary to maintain a supply of different nozzle designs with different diameters as it is the case with the initially described known realization for stabilizing a boundary layer in the laminar range by generating a volumetric suction flow over a micro-perforated surface. On the contrary, a single nozzle design with a specially designed interior wall suffices for always removing an optimal mass flow by suction under any lift conditions. In contrast to the initially described realization for stabilizing a boundary layer in the laminar range by generating a volumetric suction flow, it may also no longer be necessary to provide a plurality of suction chambers in order to constantly ensure an optimal volumetric suction flow. Due to the throttling nozzle according to one example, it may be ensured that an optimal volumetric flow is always removed by suction through each throttling nozzle in the surface with only a single suction chamber arranged underneath the surface of the aerodynamic body, around which the fluid flows.

The throttle section may be realized in the form of a labyrinth in order to ensure that the desired turbulences can be created over the throttle section of the nozzle. This refers to any design of the interior wall that causes the desired turbulences to be created over the throttle section.

The interior wall of the throttle section may be realized in the form of a sharp-edged serrated section that is, for example, cut or punched into the material of the nozzle wall. Instead of realizing the interior wall of the throttle section in the form of a sharp-edged serrated section, it would also be conceivable to choose other shapes that lead to the creation of turbulences. For example, it would be possible to provide the cross section of the interior wall with arc-shaped projections that result in turbulences of the fluid flowing past them. The interior wall of the throttle section may also be designed in many other ways that naturally will be taken into consideration by a person skilled in the art depending on the respective application.

According to an embodiment, the cross section of the above-mentioned serrated section has a continuous, repetitive concave shape (concave wave shape) such that corresponding turbulences are created in the thusly formed recesses.

As mentioned above, the serrated section may be cut into the material of the nozzle wall. This makes it possible to arrange the serrated section along the interior wall of the throttle section in the form of a helix.

The throttle section may, as mentioned above, be cut into a wall of the nozzle that is arranged in front of the first material layer. If the throttle section extends substantially parallel to and does not completely penetrate this first material layer, both sides of the first material layer are coated with a second material layer that is respectively provided with corresponding openings or bores in order to form the inlet and the outlet of the throttle section. These second material layers that serve as a coating for the first material layer and one of which forms the surface of the aerodynamic body may be realized very thin and consist, for example, of an aluminium alloy. The first material layer that contains the throttle sections, in contrast, may consist of an arbitrary material such as, for example, metal, plastic or the like.

In order to achieve a largely optimal suction power, the thickness of the first material layer should approximately correspond to the bore diameter of the openings or bores in the second material layers. Naturally, these indications only represent approximate guidelines and need to be separately adapted to the special circumstances of the respective application by a person skilled in the art.

In the above-described embodiment, the throttle section extends into the plane of and completely penetrates the first material layer such that the first material layer needs to be coated with the second material layers on both sides in order to form the throttle sections. However, this coating expenditure can be prevented if the throttle sections do not completely penetrate the first material layer, but rather are cut, for example, into the first material layer, i.e., into the surface of the aerodynamic body, approximately perpendicular.

Due to the special design of the nozzles to be arranged in the surface of the aerodynamic body, it may suffice to provide the aerodynamic body with only a single suction chamber that subjects the outlets of the plurality of throttling nozzles to a suction flow. This single suction chamber may be situated, for example, directly underneath the surface of the aerodynamic body and subjected to a defined negative pressure with the aid of a suitable pump. In this case, the determining factor for the suction power of the suction chamber is the lowest local pressure in the boundary layer of the body, around which the fluid flows, at which a defined volumetric flow just barely needs to be removed by suction. In the initially described realization for generating a volumetric suction flow, in contrast, it was common practice to subject other locations (at which the pressure exceeds a local minimum) to stronger suction without achieving any other positive boundary layer effect. Due to an example of the aerodynamic body, suction systems can be designed in a more purposeful and smaller fashion because the self-regulated flow rates make it possible to prevent the removal of excessive volumetric flows by suction. This has particularly advantageous effects if the pressure distributions vary in-flight as it may occur, for example, on the airfoils and/or on the elevator and rudder units.

According to another aspect of the aerodynamic body, the basic objective thereof is attained with an aircraft, the skin of which is at least sectionally realized in the form of an aerodynamic body with the above-described characteristics. Naturally, it may be useful, however, to realize all those components of the aircraft that are subjected to varying pressure distributions in-flight in the form of aerodynamic bodies with the above-described characteristics. For example, at least one of the aerodynamic bodies of the aerodynamic body group comprising the fuselage, the airfoils, the elevator unit, the rudder unit and the engine fairings may be at least sectionally realized in the form of the above-described aerodynamic body.

According to yet another aspect of the aerodynamic body, the basic objective thereof is attained with the utilization of a plurality of throttling nozzles with the above-described characteristics in the surface of an aerodynamic body or in the skin of an aircraft in order to reduce the frictional losses on the surface or the skin by removing a volumetric flow of the fluid that is self-regulated by the throttling nozzles from the surface by suction through the plurality of throttling nozzles with a single suction chamber such that the boundary layer of the fluid flow on the surface, around which the fluid flows, is stabilized in the laminar range.

Hence, due to one example of the aerodynamic body, the present invention a self-regulated adjustment of the respectively required suction power to the respectively location- and time-variant pressure and lift conditions may be provided. Since this eliminates the need to provide a plurality of suction chambers in dependence on the respectively prevailing pressure conditions, a certain reduction of the weight and the installation expenditure can be achieved due to the simple design of the suction system according to one example that can also be realized in a more easily accessible fashion. The above-mentioned weight reduction consequently may make it possible to lower the requirements to be fulfilled by the materials used. Since it is no longer necessary to manufacture the nozzles of the micro-perforated surface of titanium, the weight reduction achieved with the invention makes it possible to arrange the nozzles in a first material layer with higher density (such as, for example, different metals or plastics) as described above.

BRIEF DESCRIPTION OF THE FIGURES

Identical or similar components are identified by the same reference symbols in all figures. The figures show schematic representations that are not true-to-scale.

DETAILED DESCRIPTION

The examples described and drawings rendered are illustrative and are not to be read as limiting the scope of the invention as it is defined by the appended claims. In the context of the aerodynamic body, the term aerodynamic body generally refers to the components of an aircraft that are respectively subjected to dynamic lifting forces forces of suction in-flight due to the air flowing around them. This includes, in particular, the aerodynamic bodies of the aerodynamic body group comprising the fuselage, the airfoils, the elevator unit, the rudder unit and the engine fairings.

Figure 1:
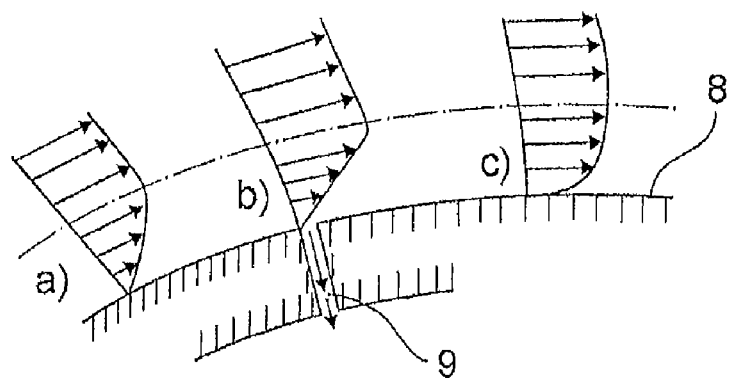
FIG. 1a shows a laminar velocity profile on a surface, around which a fluid flows.
FIG. 1b shows a suction-stabilized laminar velocity profile on a surface, around which a fluid flows.
FIG. 1c shows a turbulent velocity profile on a surface, around which a fluid flows.

The background of the aerodynamic body as well as a known suction system are initially described below with reference to FIGS. 1a-1c and with reference to FIG. 2 for the better understanding of the aerodynamic body. FIGS. 1a-1c show three different velocity profiles as they occur under different flow conditions. FIG. 1a, for example, shows an optimal flow profile with a laminar boundary layer. According to this figure, the velocity drops from its maximum volume outside the boundary layer to a value near zero at the transition to the airfoil 8, around which the fluid flows. If the velocity drops to a value near zero at the transition to the airfoil 8 as shown, this means that only low frictional losses occur.

FIG. 1c, in contrast, shows the velocity profile of a turbulent flow above the airfoil 8. Although the velocity at the transition to the airfoil 8 also drops to a value near zero in this case, this drop only occurs very close to the airfoil 8 such that significant frictional losses occur in the region of the boundary layer 4.

In order to solve this problem, it is frequently attempted, as shown in FIG. 1b, to stabilize the boundary layer in the laminar range by removing a suitable volumetric flow in a planar fashion by suction through a microscopic bore 9.

Figure 2:
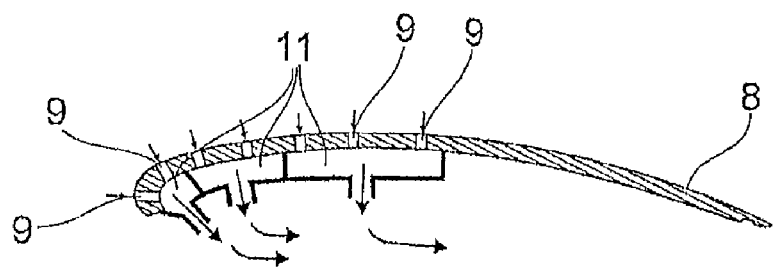
FIG. 2 shows a cross section through an airfoil with a conventional suction system featuring microscopic bores and several suction chambers.

A conventional suction system of this type is shown in FIG. 2. One can ascertain that the airfoil 8 comprises a section with a micro-perforated surface that contains a plurality of microscopic bores 9. However, this suction system is disadvantageous in that several suction chambers 11 need to be provided in order to remove a suitable volumetric flow of the fluid flowing around the airfoil 8 with each individual suction chamber depending on the prevailing lift conditions indicated in FIG. 3. Regardless of the plurality of required suction chambers 11, the diameter of the microscopic bores 9 needs to be varied in order to achieve an optimal result with the conventional suction system shown in FIG. 2.

Figure 3:
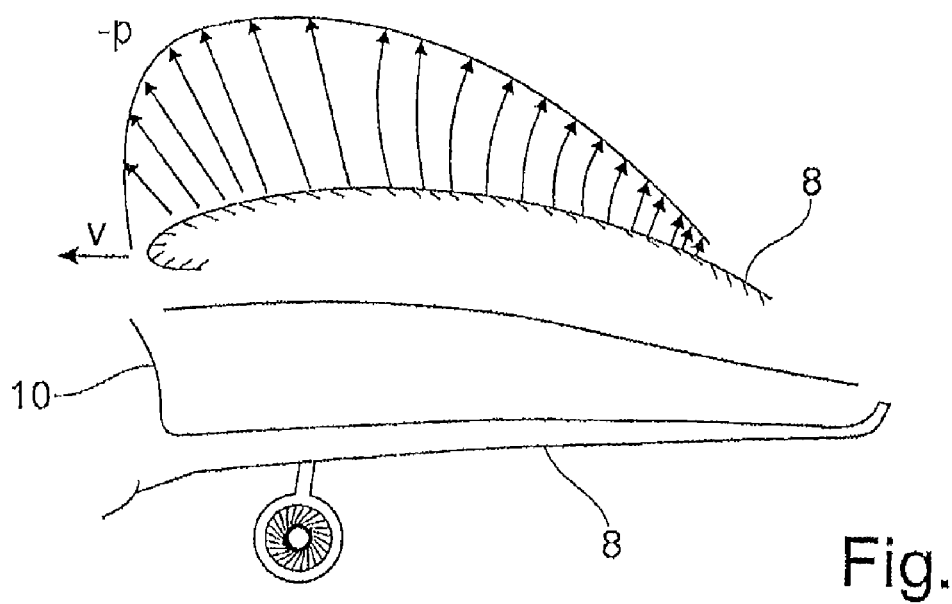
FIG. 3 shows a cross section and a projection of the pressure and lift distribution on an airfoil.

However, the lift distribution on a body, around which a fluid flows, such as the airfoils 8 shown in FIG. 3 not only changes in the flow direction of the airfoil 8, but also over the spread of the airfoil 8 as indicated in the bottom illustration of FIG. 3. This spatial lift distribution naturally is also time-variant and can hardly be managed with the conventional suction system shown in FIG. 2.

The aerodynamic body will now be described in greater detail below with reference to the other figures. According to FIGS. 4a and 4b, a throttling nozzle 1 extends through the surface of an airfoil 8. This nozzle comprises a throttle section 5 that extends substantially perpendicularly through a first material layer 6 between an inlet 2 and an outlet 3. This outlet section 3 features an interior wall that is realized in the form of a sharp-edged serrated section 4 in this case. This serrated section 4 may be cut into the first material layer 6, for example, in the form of a helix, such that a three-dimensional screw thread is created. However, it would also be conceivable that the serrated section 4 penetrates the first material layer 6 in its plane only as shown in FIG. 5, in which case, the serrations of one side lie opposite of the concave recesses of the other side.

Figures 4A, 4B:
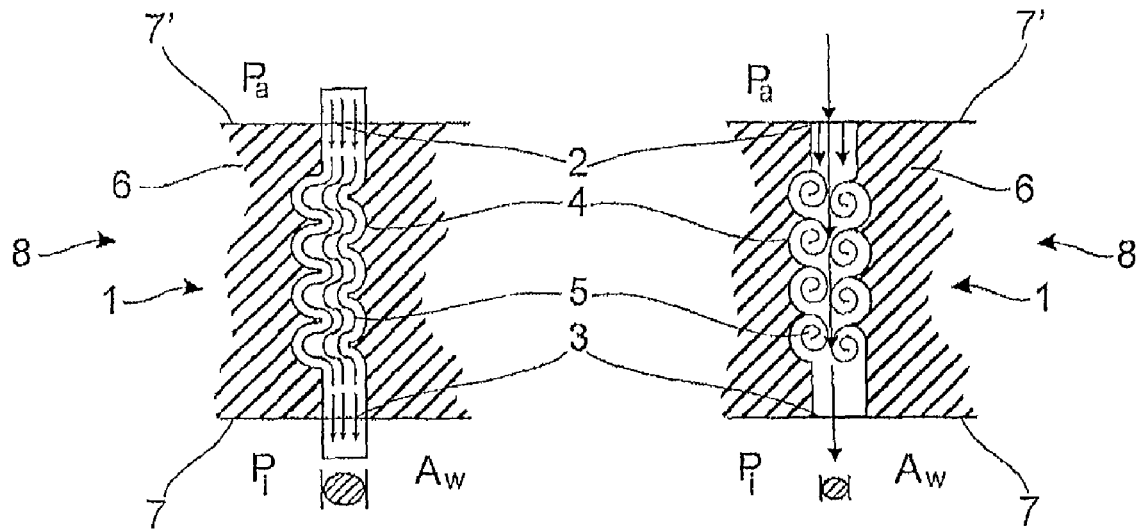
FIG. 4a schematically shows the flow conditions in a throttling nozzle of the aerodynamic body according to one example at a low pressure differential.
FIG. 4b schematically shows the flow conditions in a throttling nozzle of the aerodynamic body according to one example at a higher pressure differential.

In the instance shown in FIG. 4a, the pressure differential between the lift $P_a$ and the suction pressure $P_i$ is relatively low. In the lift profile shown in FIG. 3, this situation occurs approximately at the location, at which the lifting forces are drawn at their maximum. The relatively low pressure differential between the lift $P_a$ and the suction pressure $P_i$ results in a laminar volumetric flow being removed by suction through the throttling nozzle 1. In this case, the effective flow cross section $A_w$ of the throttling nozzles 1 approximately corresponds to clear cross section of the throttle section 5 such that a comparatively large fluid flow is removed by suction. However, such an intensive removal by suction may be the desired result because the highest velocities occur in the region of the greatest lifting forces, in which the risk of a turbulent boundary layer being created is at its greatest.

In the instance shown in FIG. 4b, the pressure differential between the lift $P_a$ and the suction pressure $P_i$ is significantly higher than under the conditions shown in FIG. 4a. In the lift profile shown in FIG. 3, this situation occurs approximately at the location, at which the lifting forces are rather low. This comparatively high pressure differential between the lift $P_a$ and the suction pressure $P_i$ results in turbulences in the concave recesses of the serrated section 4 such that the effective flow cross section $A_w$ of the throttle section 5 is reduced and a comparatively small fluid flow is removed by suction. However, this reduced removal by suction suffices in the regions with low lifting forces because the velocities are always lower at these locations such that a rather laminar boundary layer is formed. The mass flow removed by suction is thusly optimally adjusted to the suction requirement of the boundary layer in a quasi self-regulated fashion under different operating conditions.

Figure 5:
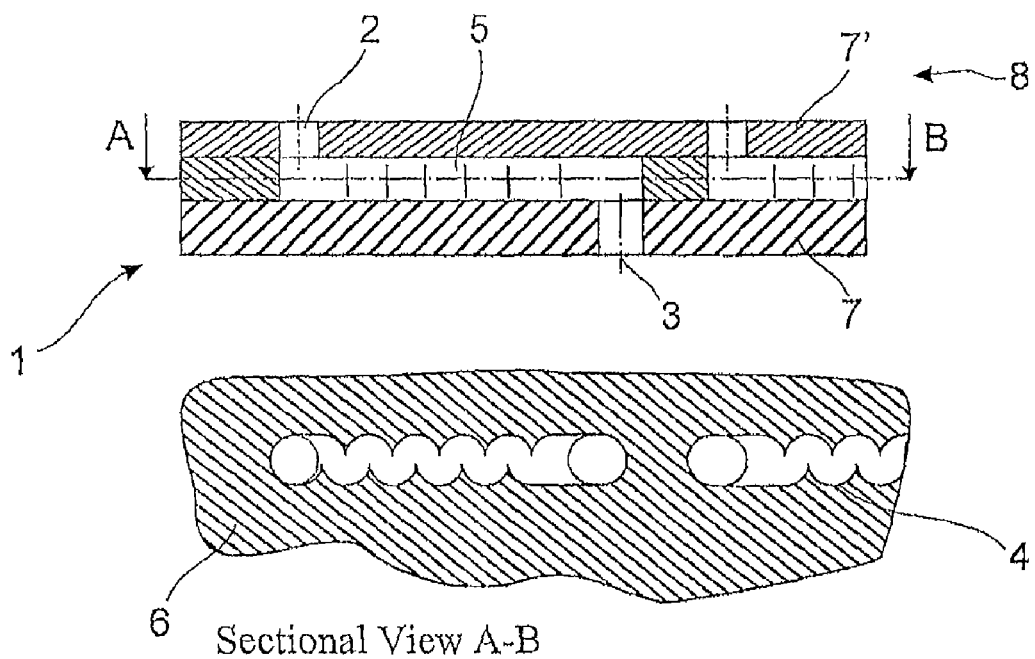
FIG. 5 shows a preferred nozzle design.

According to FIG. 5, the throttling nozzle 1 is composed of three material layers of 6, 7, 7', wherein the outermost layer 7' simultaneously forms the surface of an airfoil 8 according to one example. The throttle section 5 extends substantially parallel to and completely penetrates the first material layer 6. The outer layer 7' contains suitable bores that form the inlet 2 of the throttle section 5 and may utilize very thin material, e.g., of an aluminum alloy. The inner layer 7 may be realized analogously and also features a bore that forms the outlet 3 of the throttling nozzle. A layer 6 of an arbitrary material, for example, metal or plastic, is situated between these two layers 7, 7' and contains the throttle section 5 that is cut into this layer in the form of a sharp-edged serrated section as shown. This first material layer 6 has a thickness that approximately corresponds to the bore diameter of the second layer 7, 7' and may not exceed 0.5 mm.

In addition to the throttle sections 5 shown, the first material layer 6 may also be realized such that hot air for heating the skin of an aircraft is conveyed through this layer in special auxiliary air channels. Alternatively, it would also be conceivable to realize this layer in the form of a thermal mat with resistance wires that is heated electrically. This embodiment is advantageous in that the formation of ice on the surface can be reduced or even prevented in this fashion.

Alternative combinations and variations of the examples provided will become apparent based on this disclosure. It is not possible to provide specific examples for all of the many possible combinations and variations of the embodiments described, but such combinations and variations may be claims that eventually issue.

REFERENCE LIST

| | |
|---|---|
| 1 | Throttling nozzle |
| 2 | Inlet |
| 3 | Outlet |
| 4 | Serrated section |
| 5 | Throttle section |
| 6 | First material layer |
| 7, 7' | Second material layer |
| 8 | Airfoil |
| 9 | Microscopic bore |
| 10 | Aircraft fuselage |
| 11 | Suction chamber |

What is claimed is:

1. An aerodynamic body of an aircraft for utilizing flow conditions on a surface of the aerodynamic body, the aerodynamic body comprising:
   a surface, around which a fluid flows; and
   a plurality of nozzles in the surface, each comprising a throttle section having an inlet, an outlet and a shape of an interior wall such that turbulence is created in the throttle section,
   wherein the turbulence created by the shape of the interior wall of the throttle section of each of the plurality of nozzles reduces an effective cross section for the fluid flowing through the throttle section as a pressure differential between the inlet and the outlet of the throttle section increases, providing a self-regulating flow rate through the plurality of nozzles.

2. The aerodynamic body of claim 1, wherein the shape of the interior wall of the throttle section of each of the plurality of nozzles is in the form of a labyrinth.

3. The aerodynamic body of claim 1, wherein the shape of the interior wall of the throttle section of each of the plurality of nozzles is in the form of a sharp-edged serrated section.

4. The aerodynamic body of claim 3, wherein the sharp-edged serrated section comprises a continuous, repetitive concave wave shape.

5. The aerodynamic body of claim 3, wherein the sharp-edged serrated section extends along the interior wall of the throttle section in the form of a helix.

6. The aerodynamic body of claim 1, wherein the throttle section is cut or punched into a first material layer.

7. The aerodynamic body of claim 6, wherein the throttle section extends substantially parallel to the first material layer.

8. The aerodynamic body of claim 7, wherein the throttle section completely penetrates the first material layer.

9. The aerodynamic body of claim 6, wherein each of two opposite sides of the first material layer are coated with a second material layer, the two second material layers coating each of the two opposite sides are provided with two openings forming the inlet and the outlet of the throttle section.

10. The aerodynamic body of claim 9, wherein a thickness of the first material layer is scaled to correspond to a bore diameter of the openings provided in the two second material layers.

11. The aerodynamic body of claim 6, wherein the throttle section extends substantially perpendicular to the first material layer.

12. The aerodynamic body of claim 1, further comprising a single suction chamber fluidically coupled with each of the outlets of the throttle section of the plurality of nozzles such that the fluid at the surface is fluidically coupled to a suction flow in the single suction chamber.

13. An aircraft, comprising a skin incorporating an aerodynamic body of claim 1.

14. The aircraft of claim 13, wherein the aerodynamic body is selected from the group of aerodynamic bodies consisting of an airfoil, a fuselage, an elevator unit, a rudder unit, an engine fairing, and a combination thereof.

* * * * *